(12) United States Patent
Su et al.

(10) Patent No.: US 10,693,806 B2
(45) Date of Patent: Jun. 23, 2020

(54) NETWORK BANDWIDTH RESERVATIONS FOR SYSTEM TRAFFIC AND VIRTUAL COMPUTING INSTANCES

(71) Applicant: VMware, Inc., Palo Alto, CA (US)

(72) Inventors: Chi-Hsiang Su, Santa Clara, CA (US); Akshay Katrekar, Mountain View, CA (US); Guolin Yang, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 518 days.

(21) Appl. No.: 14/644,789

(22) Filed: Mar. 11, 2015

(65) Prior Publication Data

US 2016/0269318 A1    Sep. 15, 2016

(51) Int. Cl.
*H04L 12/927* (2013.01)
*H04L 12/911* (2013.01)
*H04L 12/915* (2013.01)
*H04L 12/24* (2006.01)

(52) U.S. Cl.
CPC ........ *H04L 47/805* (2013.01); *H04L 41/5025* (2013.01); *H04L 41/5041* (2013.01); *H04L 47/72* (2013.01); *H04L 47/785* (2013.01); *H04L 41/5096* (2013.01)

(58) Field of Classification Search
CPC ........ G06F 9/50; G06F 9/485; G06F 9/45558; G06F 9/5044; G06F 9/5072; G06F 9/5077; G06F 2009/45595; H04L 12/4641; H04L 12/5695; H04L 41/142; H04L 41/0806; H04L 41/0896; H04L 41/5025; H04L 41/5041; H04L 41/5096; H04L 45/66; H04L 45/48; H04L 45/245; H04L 47/11; H04L 47/12; H04L 47/72; H04L 47/728; H04L 47/785; H04L 47/805; H04L 49/00; H04L 49/15; H04L 49/25; H04L 49/70; H04L 63/1408; H04L 63/1458; H04L 41/5051; H04L 43/0876; H04L 47/70;
(Continued)

(56) References Cited

U.S. PATENT DOCUMENTS

8,027,354 B1 * 9/2011 Portolani ................ H04L 49/70
370/395.2
8,824,485 B2 * 9/2014 Biswas ............... H04L 12/4641
370/395.53
(Continued)

*Primary Examiner* — Nicholas R Taylor
*Assistant Examiner* — Michael Li
(74) *Attorney, Agent, or Firm* — Patterson + Sheridan, LLP (57) ABSTRACT

Virtual computing instances are provisioned with network resource allocation constraints, which may include hard constraints that must be met in order for the virtual computing instances to be created in a host server. Network resources from multiple hosts may be pooled in a virtual switch, and a cloud management system (CMS) may ensure that a network bandwidth reservation for a new virtual computing instance can be accommodated by network bandwidth in the pool that is reserved for communication endpoint traffic. In addition to such CMS-level constraint enforcement, techniques disclosed herein may also enforce network bandwidths constraints at the host level to guarantee that network bandwidth reservation requirements for communication endpoint(s) of a new virtual computing instance can be satisfied by a particular host before creating the virtual computing instance in that host.

21 Claims, 5 Drawing Sheets

(58) Field of Classification Search
CPC ..... H04L 41/0893; H04L 49/35; H04L 49/65;
H04L 49/254; H04L 63/20; H04L 69/321
See application file for complete search history.

(56) References Cited

U.S. PATENT DOCUMENTS

| | | | |
|---|---|---|---|
| 2009/0141731 A1* | 6/2009 | Bitar | H04L 12/5695 370/412 |
| 2009/0144393 A1* | 6/2009 | Kudo | G06F 9/5044 709/218 |
| 2009/0222558 A1* | 9/2009 | Xu | G06F 9/485 709/224 |
| 2010/0257263 A1* | 10/2010 | Casado | H04L 49/00 709/223 |
| 2013/0242983 A1* | 9/2013 | Tripathi | H04L 49/25 370/355 |
| 2013/0343191 A1* | 12/2013 | Kim | H04L 47/11 370/235 |
| 2014/0258535 A1* | 9/2014 | Zhang | H04L 41/0806 709/226 |
| 2015/0067170 A1* | 3/2015 | Zhang | H04L 47/70 709/226 |

* cited by examiner

NETWORK BANDWIDTH RESERVATIONS FOR SYSTEM TRAFFIC AND VIRTUAL COMPUTING INSTANCES

BACKGROUND

Computer virtualization is a technique that can involve encapsulating a physical computing machine platform into a virtual machine (VM) that is executed under the control of virtualization software running on a hardware computing platform (also referred to herein as "host system" or "host computer"). A group of hardware computing platforms may be organized as a cluster to provide the hardware resources for VMs.

Traditional network resource allocation techniques, such as shares, permit some VM data traffic to have higher priority over other VM traffic. However, such techniques do not provide guarantees on network bandwidth, particularly for egress traffic. For example, even if an application running in one VM and needing a minimum throughput for performance is given high priority, the effective priority for the high priority application is reduced when many VMs on the host share the same physical network interface device resource. As a result, the high priority application may not have the needed minimum bandwidth. Similar to virtual machine traffic, system traffic such as live VM migration traffic, virtual storage area network (VSAN) traffic, host-based replication (HBR) traffic, network file system (NFS) traffic, Internet Small Computer System Interface (iSCSI) traffic, and the like may also require network bandwidth guarantees. Traditional solutions do not provide bandwidth guarantees to such system traffic. In addition, traditional VM placement engines such as VMware® Distributed Resource Scheduler™ do not account for network bandwidth demands of VMs. Such placement engines may place multiple network-sensitive VMs on the same physical host system, thereby affecting their network performance.

SUMMARY

One embodiment provides a computer-implemented method for provisioning a virtual computing instance on a host computer device. The method generally includes receiving a request to provision the virtual computing instance, where a communication endpoint of the virtual computing instance is associated with a network bandwidth reservation specifying a minimum bandwidth guaranteed to the communication endpoint. The method further includes identifying a physical network interface device of the host computing device, if any, having sufficient bandwidth to accommodate the network bandwidth reservation. In addition, the method includes, if the physical network interface having sufficient bandwidth is identified, assigning the communication endpoint to the identified physical network interface and creating the virtual computing instance in the host computer, and, if no physical network interface having sufficient bandwidth is identified, not creating the virtual computing instance in the host computer.

Further embodiments of the present invention include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques for provisioning virtual computing instances with network resource allocation constraints. Virtual machines (VMs) having virtual network adapters (also referred to herein as "virtual network interface cards" or "VNICs") are used herein as a reference example of virtual computing instances and hypervisors as an example of a hardware abstraction layer on top of a host computer that allows multiple contexts or virtual computing instances to share the hardware resources of the host computer. However, it should be understood that techniques disclosed herein are also applicable to other types of virtual computing instances such as containers, which may not include VNICs. In one embodiment, the network resource allocation constraints are applied at the virtual (as opposed to physical) level and may include hard constraints that must be met in order for the virtual computing instances to be created in host servers. Particular network resource allocation constraints may include reservations specifying minimum bandwidth guaranteed to VNICs of VMs, limits specifying maximum bandwidths that can be allocated to VNICs, and share values specifying weights provided to flows of VNICs when sharing bandwidth available for burst. Further, limits, shares, and reservations may be applied as constraints for virtual infrastructure traffic (e.g., management traffic, live VM migration traffic, virtual storage area network (VSAN) traffic, etc.) bandwidth allocation that is specified on a per virtual switch basis.

In one embodiment, network resources from multiple host servers may be pooled in a virtual switch, which may be, e.g., a distributed virtual switch (DVSwitch). In such a case, a cloud management system (CMS) application may enforce a policy that partitions the aggregated physical NIC bandwidth in a given network resource pool into bandwidth reserved for the virtual infrastructure traffic and for VM VNIC traffic (also referred to herein as the VM VNIC resource pool). When a new VM is being added to such a network resource pool, the CMS application may first ensure that the VM's network bandwidth reservation, if any, can be accommodated by the VM VNIC traffic reservation bandwidth for the network resource pool. This is a configuration admission control in the sense that if the reservation bandwidth configuration violates the bandwidth reserved for VM VNIC traffic, the configuration is not allowed.

In addition to CMS-level constraint enforcement, embodiments disclosed herein may also enforce network bandwidths constraints at the host level. When VM or system traffic bandwidth reservation configurations are pushed down to the host, admission control is enforced therein so that the VM is only allowed to be powered on if network bandwidth reservation requirements for VNICs of the VM are satisfied. In one embodiment, the virtualization software module may identify a physical network interface device, such as a physical network interface card (PNIC), having the largest available bandwidth, and assign one or more VNICs of the VM to this PNIC if their network bandwidth reservation requirements are satisfied. If no such PNIC (or set of PNICs) can be identified that satisfies the network bandwidth reservation requirements, the virtualization software module may further perform a defragmentation operation in which VNICs currently assigned to some PNICs are reassigned to other PNICs in an attempt to free sufficient bandwidth in one or more PNICs to accommodate the VINCs of the new VM. It should be understood that similar placement of the VM in VM host servers with PNICs capable of accommodating the bandwidth reservation requirements of the VM's VNICs may also be made by a resource scheduler responsible for dynamic load balancing of workloads across VM hosts in a virtual computing environment, as well as a high availability module which provides failover protection in case any VM host fails.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1A:
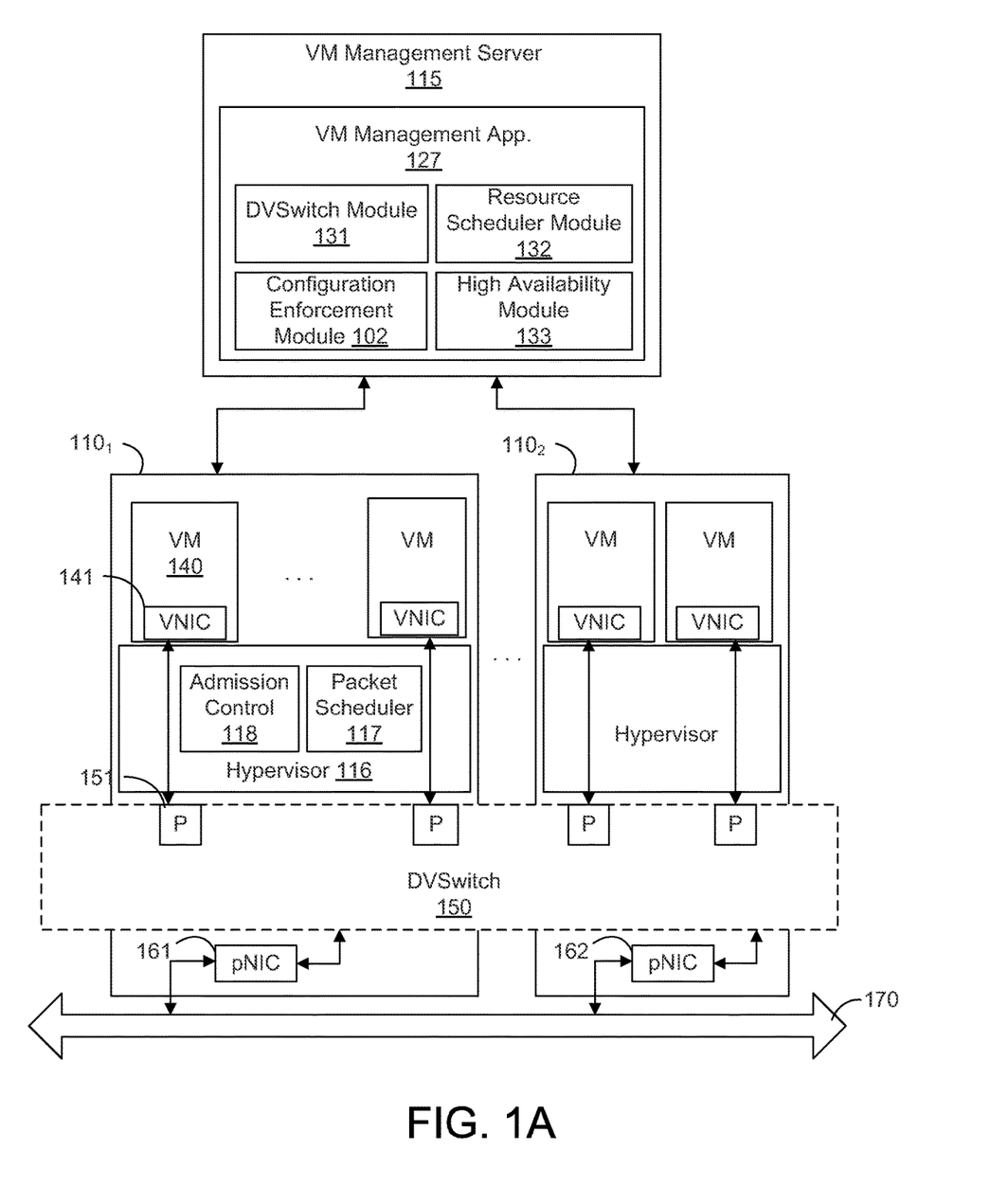
FIG. 1A illustrates components for managing network resource allocation in a virtual infrastructure, according to an embodiment.

FIG. 1A illustrates components for managing network resource allocation in a virtual infrastructure, according to an embodiment. As shown, a virtualized computing environment 100 includes host computers $110_{1-2}$ in communication with a virtual machine (VM) management center 102. Host computers $110_{1-2}$ are configured to deliver virtualization-based distributed services to information technology environments. Each host computer 110 may be constructed on conventional, typically server-class, hardware platforms that include one or more central processing units (CPUs), memory, and physical network interface cards (PNICs) 135 (e.g., PNICs 161-162). Each host computer 110 provides a virtualization layer (e.g., hypervisor 116) that abstracts processor, memory, storage, and/or networking resources into multiple virtual machines (e.g., virtual machine 116) that run side-by-side on the same physical host computer 110. That is, the virtualization software partitions physical host computers 110 into multiple secure and portable virtual machines that run on the same physical servers. Each virtual machine (e.g., VM 140) represents a complete system—with processors, memory, networking, storage, and/or BIOS. In one embodiment, virtualization software can be installed directly on the server hardware and inserts a virtualization layer between the hardware and the operating system. Alternatively, the virtualization software may run on top of a conventional operating system in the server.

A virtual machine (VM) management application 127 running in a VM management server 115 is a cloud management system that manages the virtual infrastructure, including managing the host computers $110_{1-2}$, the virtual machines running within each host computer 110, provisioning, migration, resource allocations, and so on. One feature of the virtualized computing environment that is controlled by the VM management application 127 is virtual networking. Each virtual machine includes a software-based virtual network adapter that is logically connected to a physical network adapter included in a host computer that provides network access for the virtual machine. The virtual network adapter is connected to the physical network adapter through a software-based "switch." One way to manage virtual network connections for a network having a large number of virtual machines running on multiple physical servers is via a "distributed virtual switch" described in U.S. Pat. No. 8,195,774, incorporated in its entirety herein by reference. DVSwitches permit users to manage virtual switches on multiple physical servers via a single interface, rather than individually. Further, DVSwitches persist port runtime states across physical servers to create true virtual networks.

As shown, a distributed virtual switch 150 spans first and second hosts $110_{1-2}$. In this conceptualization, each VNIC (e.g. VNIC 141) is attached to DVSwitch 150, which is associated with physical NICs 161-162 of hosts $110_{1-2}$. That is, each VNIC is attached to a distributed virtual port (e.g., port 151), which are collectively managed by DVSwitch 150, and DVSwitch 150 in turn provides connectivity to the VNICs to network 170 via physical NICs 161-162. From the user's perspective, specific knowledge of settings and state of individual virtual ports and virtual switches in each host computer, is unnecessary. In this way the DVSwitch represents a convenient abstraction of underlying logic implementing links between VNICs and virtual switches, allowing the user to manage the DVSwitch as an abstraction of a physical switch.

In one embodiment, network resource allocation policies may be specified on a per-DVSwitch basis such that all host computers (e.g., hosts 1100 which participate in the DVSwitch (e.g., DVSwitch 15) are subject to the policies. Such network resource allocation policies may include reservations specifying minimum bandwidths guaranteed to management traffic, live VM migration traffic, virtual storage area network (VSAN) traffic, and the like; limits specifying maximum bandwidths that can be allocated to the same traffic; and share values specifying weights provided to different types of traffic when sharing bandwidth available for burst. Similar limits, shares, and reservations may be applied at the VNIC level to control resource allocation for that VNIC. The virtual infrastructure and VM traffic may be separately allocated to ensure that system operations, such as VM migration, do not adversely affect VM operations, and vice versa.

Network resources from host servers $110_{1-2}$ may be pooled in a DVSwitch 150, and VM management application 127 may enforce a policy that partitions the aggregated physical NIC bandwidth in such a pool into bandwidth reserved for virtual infrastructure traffic and for VM VNIC traffic. When a new VM is being added to a given network resource pool, VM management application 127 may enforce the VM VNIC traffic reservation constraint as well as the new VM's network bandwidth reservation constraint, if any, by ensuring that the new VM's network bandwidth reservation constraint can be accommodated by the VM VNIC traffic reservation bandwidth for the network resource pool. If the new VM's network bandwidth reservation configuration cannot be accommodated, then VM management application 127 may prevent the new VM from being added to the resource pool. For example, if one tenant is assigned a resource pool with 2 GB of network bandwidth and the tenant's VMs have already reserved 2 GB of bandwidth, then VM management application 127 may not permit another VM to be added to resource pool.

In one embodiment, network resource allocation constraints may also be enforced at the host level by an admission control module 118 of hypervisor 116. Admission control module 118 may guarantee that network bandwidth reservation requirements for VNICs that have been pushed down to the host server are satisfied before powering on the VM in the host server. In particular, admission control module 118 may apply a worst-fit first bin-packing algorithm that assigns the VNICs of a new VM to PNICs having the most free resources so as to distribute the network load roughly equally across the PNICs. If the VM cannot be placed using such a bin-packing algorithm, then admission control module 118 may further perform a defragmentation operation, discussed in greater detail below, in which VNICs currently assigned to particular PNICs are reassigned to other PNICs in an attempt to free sufficient bandwidth in one or more PNICs to accommodate the VNICs of the new VM. It should be understood that it may not be possible to accommodate the VNICs of the new VM on the host. In such a case, admission control module 118 may generate an alert that is sent to VM management application 127, and resource scheduler module 132 may then migrate the VM off of the host to a different host. Assuming the VNIC is placed on the host, a packet scheduler module 117 then schedules packets to and from the VNICs according to the bandwidth reservation requirement and other policies, such as limits and shares, discussed above. That is, packet scheduler module 117 attempts to schedule packets to provide the bandwidth specified under the bandwidth reservation constraint, among other things.

In another embodiment, similar placement of the VM in VM host servers with PNICs capable of accommodating the bandwidth reservation requirements of the VM's VNICs may also be made by a resource scheduler 132 responsible for dynamically balancing workloads across VM hosts in a virtual computing environment or a high availability module 133 which provides failover protection in case any VM host fails. In such a case, the runtime information pertaining to physical NICs typically collected by VM management application 127, including the list of currently placed VNICs on PNICs for the DVswitch as well as available capacity of the PNICs, may be provided to resource scheduler 132 and high availability module 133. Using such information, resource scheduler 132 may place VMs during dynamic load balancing using, among other things, the worst-fit first algorithm in which VNICs of the VM are assigned to PNICs having the most free resources. That is, resource scheduler 132 considers, in addition to things such as CPU and memory, the available network bandwidth on host servers. For example, if network bandwidth is insufficient on one host, resource scheduler 132 may move one or more VMs to another host based on the worst-fit-first algorithm. High availability module 133 or resource scheduler 132 may employ a similar process to place VMs when a host server or PNIC fails. That is, high availability module 133 or resource scheduler 132 may provide failover protection by automatically moving and/or reassigning the VMs of a failed PNIC or host to another PNIC (or host) using the worst-fit first algorithm.

Figure 1B:
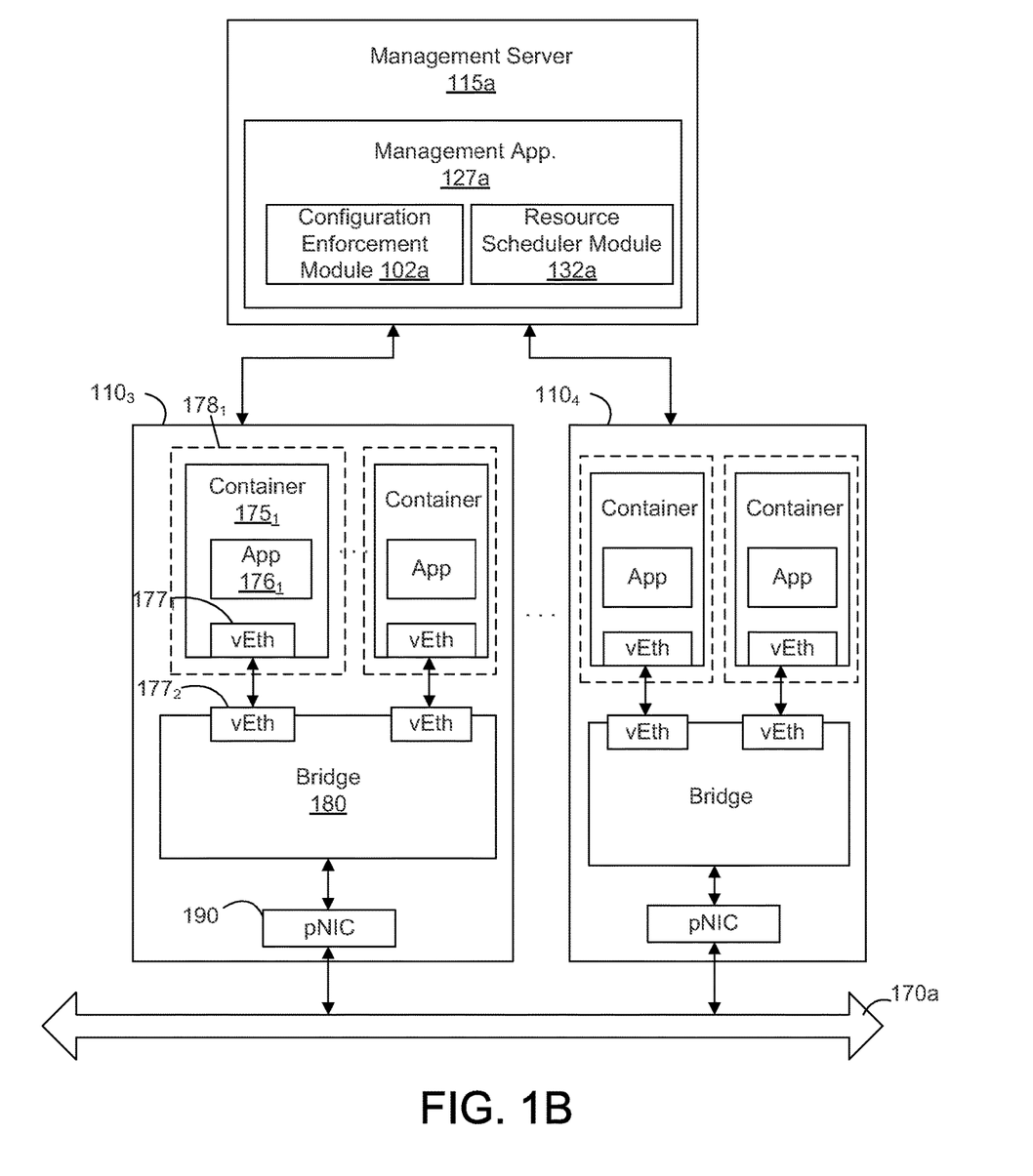
FIG. 1B illustrates components for managing network resource allocation in a virtual infrastructure, according to an alternative embodiment.

FIG. 1B illustrates components for managing network resource allocation in a virtual infrastructure, according to an alternative embodiment. Although discussed herein primarily with respect to VNICs of VMs, VMs are only used as an example of virtual computing instances and hypervisors as an example of a hardware abstraction layer on top of a host computer that allows multiple contexts or virtual computing instances to share the hardware resources of the host computer. The VM virtual computing instances are isolated from each other, each having at least a user application running therein, and the hardware abstraction layer thus provides benefits of resource isolation and allocation among the virtual computing instances.

Embodiments disclosed herein may also apply to other examples of virtual computing instances, such as containers $175_{1-2}$ not including a guest operation system, referred to herein as "OS-less containers" (see, e.g., www.docker.com), illustrated in FIG. 1B. OS-less containers $175_{1-2}$ implement operating system-level virtualization, wherein an abstraction layer is provided on top of the kernel of an operating system (not shown) on a host computer $110_3$. The abstraction layer supports multiple OS-less containers (e.g., containers $175_{1-2}$) each including an application (e.g., applications $176_{1-2}$) and its dependencies. Each OS-less container 175 runs as an isolated process in userspace on the host operating system and shares the kernel with other containers. The OS-less container 175 relies on the kernel's functionality to make use of resource isolation (CPU, memory, block I/O, network, etc.) and separate namespaces and to isolate the application's view of the operating environments. By using OS-less containers $175_{1-2}$, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O.

As shown, a virtual Ethernet bridge 180 connected to PNIC 190 and OS-less containers $175_{1-2}$ is responsible for forwarding packets between network interfaces attached to bridge 180. When an OS-less container (e.g., one of containers 1750 is created, the abstraction layer that supports the OS-less containers may also create a pair of virtual Ethernet (vEth) interfaces (e.g., vEth interfaces $177_{1-2}$), one of which is assigned to the new OS-less container's network namespace and the other of which is connected to bridge 180. The pair of vEths are tunnel drivers that act as a bidirectional pipe, with traffic entering one vEth in the pair exiting the other vEth.

In one embodiment, network resource allocation constraints may be provided that include reservations specifying minimum bandwidth guaranteed to each OS-less container through its vEth, limits specifying maximum bandwidths that can be allocated to OS-less containers, and share values specifying weights provided to flows of OS-less containers when sharing bandwidth, similar to the discussion above with respect to VNICs and VMs. Configuration admission control may be enforced by a configuration enforcement module 102*a* of management application 127*a* running in management server 115*a* such that, if the reservation bandwidth configuration violates the total bandwidth reserved for OS-less container traffic in a network resource pool, the configuration is not allowed. Further, an OS-less container may be created in a particular host machine only if associated network resource allocation constraints can be met. The worst-fit first bin-packing algorithm and defragmentation algorithms discussed herein may be employed (e.g., by a resource scheduler module 132*a* which is similar to resource scheduler module 132) to select a host machine on which to create the OS-less container, based on the network resource allocation constraints, and/or a host machine to move a container to. In addition, limits, shares, and reservations may also be applied as constraints for infrastructure traffic relevant to OS-less containers.

For purposes of illustration, the system of FIG. 1A in which VMs having VNICs and running in host computers is employed in the examples of FIGS. 2-4, below. However, it should be recognized that the system of FIG. 1B may also be employed.

Figure 2:
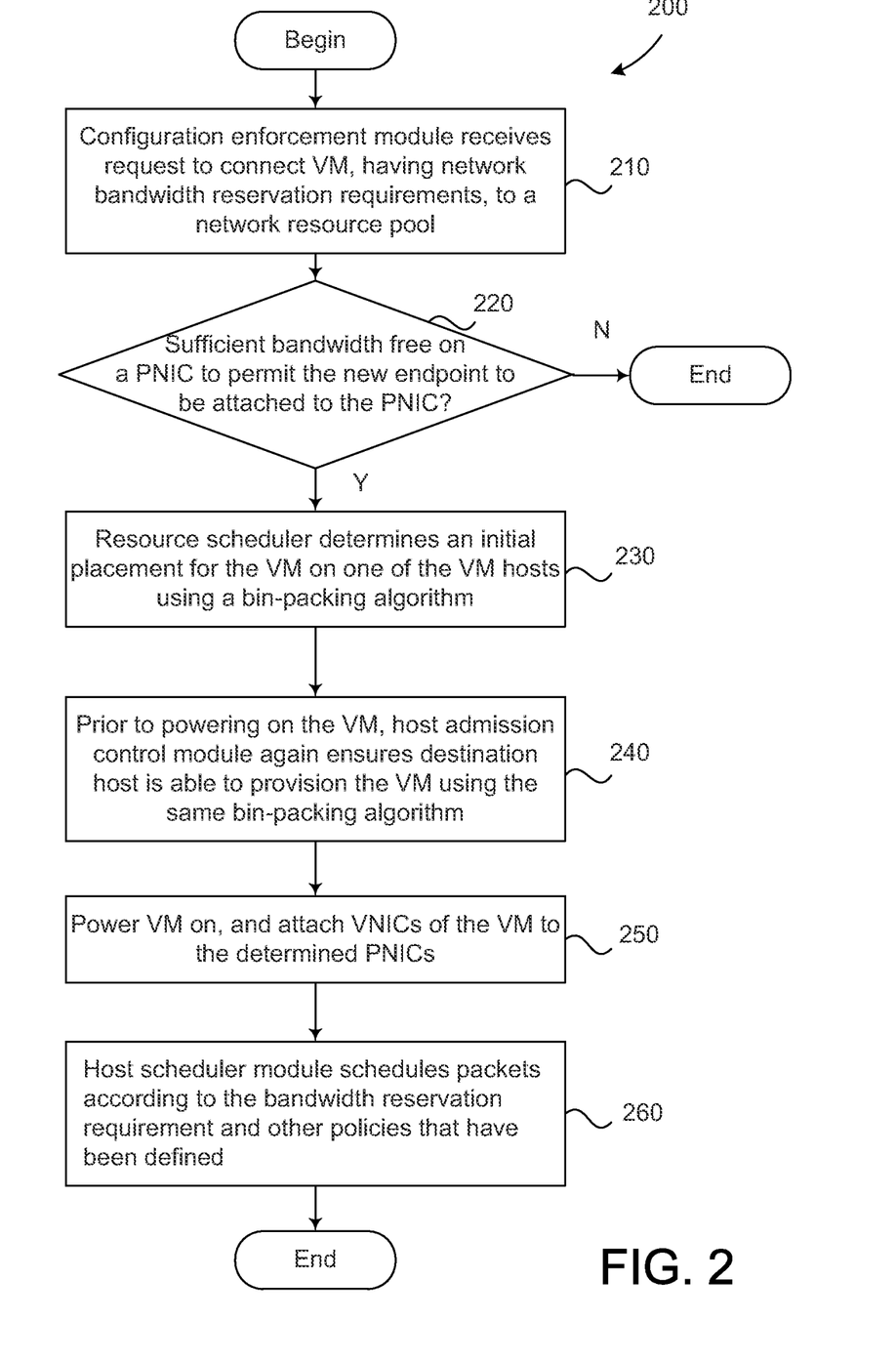
FIG. 2 illustrates a method for provisioning a virtual machine to satisfy network bandwidth reservations, according to an embodiment.

FIG. 2 illustrates a method 200 for provisioning a virtual machine to satisfy network bandwidth reservations, according to an embodiment. As shown, the method 200 begins at step 210, where configuration enforcement module 102 receives a request to connect a VM, having network bandwidth reservation requirements, to a network resource pool. As discussed, the bandwidth reservation requirements may specify minimum bandwidth guarantees for respective VNICs of the VM, as defined by a user.

At step 220, configuration enforcement module 102 determines whether the VM's reservation requirements fit in the aggregated reservation bandwidth of the network resource pool. The network resource allocation requirements may be specified in the form of limits, shares, and reservations for various types of system traffic, as well as VM traffic on a DVSwitch. As discussed, the system and VM traffic may be separated to ensure that system operations, such as VM migration, do not adversely affect VM operations, and vice versa. For example, the network resource pool may include 2 Gb of bandwidth provided by 2 PNICs, each having 1 Gb bandwidth. Out of the 2 Gb of bandwidth, assume that 500 Mb is allocated for VM VNIC traffic and that 400 Mb of this allocated bandwidth is reserved for other VNICs of VMs. In such a case, configuration enforcement module may determine that the new VM's reservation requirements fits in the aggregate reservation bandwidth of the network resource pool if the VM's VNIC's bandwidth reservations are less than or equal to 100 Mb.

If the reservation requirements fit in the aggregated reservation bandwidth of the network resource pool, then at step 230, resource scheduler 133 determines an initial placement for the VM on one of the VM hosts using, among other things (e.g., CPU and memory usage), a bin-packing algorithm which accounts for available network bandwidth. In one embodiment, the bin-packing algorithm may be a worst-fit first algorithm that assigns the VNICs of the VM to PNICs having the most free resources. Such an algorithm attempts to distribute the network load roughly equally across the PNICs, rather than placing too much of the load on an individual PNIC. Doing so provides space for growth so that, even if bandwidth usage by the VNICs attached to the PNIC exceeds their respective reservation minimums and network resources are under contention, there may still be excess bandwidth to meet the bandwidth requirements of the VNICs. In another embodiment, resource scheduler 133 may treat the network resource constraint as a last check after a host is otherwise selected based on, e.g., CPU and/or memory entitlement computations.

At step 240, prior to powering on the VM, host admission control module 118 running in the host server again ensures the host is able to provision the VM using the bin-packing algorithm used at step 230, and by defragmenting PNICs to free up bandwidth for the VM, as appropriate. This admission control check differs from that at step 230 in that resource scheduler 133 runs in VM management server 115 and considers available runtime data on network bandwidth usage, VNICs assigned to PNICs, etc. However, the host may have run out of capacity since the runtime data was collected, so the host-level admission control by host admission control module 118 performs an additional check, thereby providing two-way admission control to ensure that bandwidth reservation requirements can be met. In addition, resource scheduler 133 applies a stricter placement approach in choosing a VM host and initial placement that does not consider defragmenting PNICs to free up additional network bandwidth.

The defragmentation algorithm may be applied, e.g., where there would otherwise be insufficient bandwidth to accommodate the VM. For example, assume the host has two PNICs providing 1 Gb bandwidth each, and VNICs that are already assigned to the PNICs use more than 900 Mbs of each of the PNIC's bandwidths. A VM having a VNIC with a 100 Mb bandwidth reservation could not be attached to either of these PNICs. In such a case, admission control module 118 may attempt to reassign the VNICs already attached to the PNICs to different PNICs to create more than 100 Mbs of free bandwidth on one of the PNICs to accommodate the new VNIC.

Figure 3:
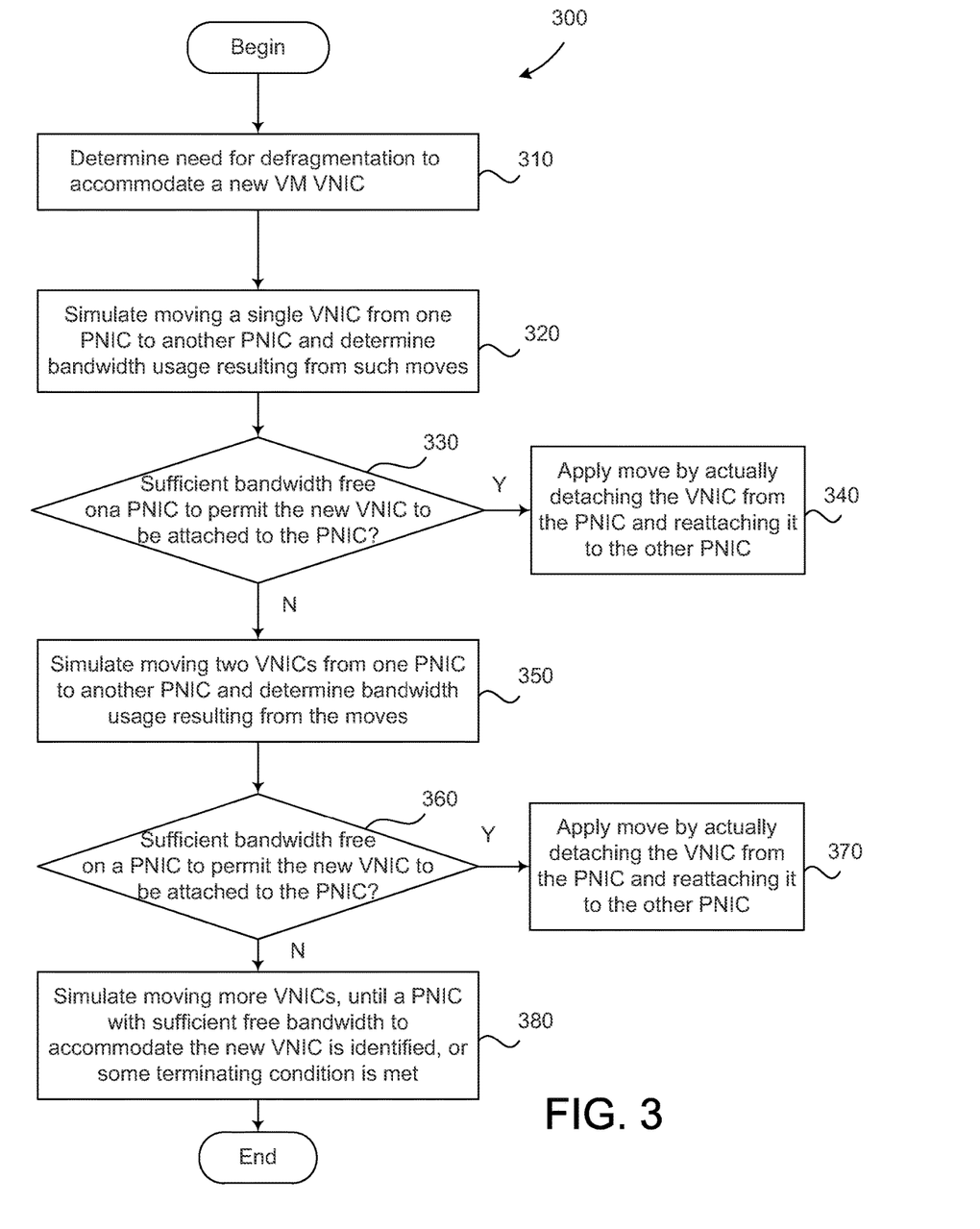
FIG. 3 illustrates a method for increasing free bandwidth on physical network interface devices, according to an embodiment.

In one embodiment, the defragmentation algorithm may iterate through possible reassignments of VNICs to PNICs, according to the method 300 illustrated in FIG. 3. As shown, the method 300 begins at step 310, where host admission control module 118 determines the need for defragmentation to accommodate a new VM VNIC. As discussed, defragmentation may be needed to increase free bandwidth on one or more PNICs and permit VNICs to be connected to those PNICs.

At step 320, host admission control module 118 (repeatedly) simulates moving a single VNIC from one PNIC to another PNIC and determines bandwidth usage resulting from such moves. If host admission control module 118 determines that moving one of the VNICs frees up sufficient bandwidth on a PNIC to permit the new VNIC to be attached to the PNIC at step 330, then at step 340, host admission control module 118 applies that move by actually detaching the VNIC from the PNIC and reattaching it to the other PNIC. Host admission control module 118 may then power on the new VM and attach its VNIC to the PNIC with sufficient free bandwidth to accommodate the new VNIC.

If, however, moving a single VNIC does not provide sufficient bandwidth on any PNIC to permit the new VNIC to be attached to a PNIC, then at step 350, host admission control module 118 (repeatedly) simulates moving two VNICs from one PNIC to another PNIC and determines bandwidth usage resulting from the moves. If host admission control module 118 determines that moving two VNICs frees up sufficient bandwidth on a PNIC to permit the new VNIC to be attached to the PNIC, then at step 360, host admission control module 118 applies the moves by actually detaching the two VNICs from the PNIC(s) and reattaching the VNICs to the other PNIC(s). Host admission control module 118 may further power on the new VM and attach its VNIC to the PNIC with sufficient free bandwidth to accommodate the new VNIC.

If moving two VNICs still does not provide sufficient bandwidth on any PNIC to permit the new VNIC to be attached to a PNIC, then at step 370, host admission control module 118 further simulates moving more (e.g., three, four, five, etc.) VNICs, similar to steps 320 and 350, until a PNIC with sufficient free bandwidth to accommodate the new VNIC is identified, or some terminating condition is met (e.g., a given number of attempts have been made, the possible moves have been exhausted, etc.).

If ultimately no PNIC on the host is identified as being able to accommodate the VNICs of the new VM, then admission control module 118 may generate an alert that is sent to VM management application 127. The alert may then be handled by, e.g., resource scheduler module 132 migrating the VM to another host server.

Returning to FIG. 2, if a PNIC is identified as accommodating the VNICs of the new VM, then at step 250, the VM is powered on, and VNICs of the VM are attached to the determined PNICs. Then, at step 260, packet scheduler module 117 schedules packets according to the bandwidth reservation requirement and other policies, such as limits and shares, that have been defined. If packet scheduler module 117 cannot meet the bandwidth reservation requirement, packet scheduler module 117 may raise a flag that is then handled by, e.g., resource scheduler 132 moving one or more VMs to other PNICs or hosts.

Figure 4:
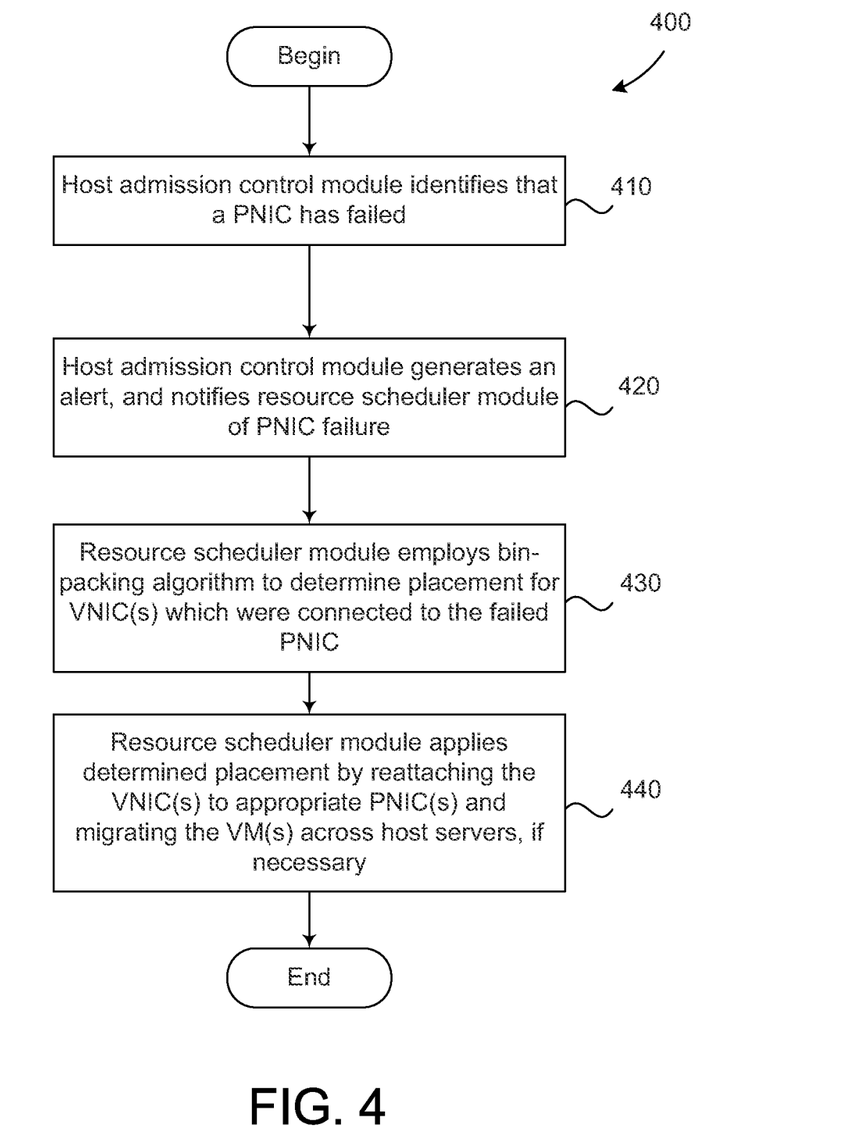
FIG. 4 illustrates a method for rebalancing communication endpoint-to-physical network interface device assignments in case of failure of a physical network interface device, according to an embodiment.

FIG. 4 illustrates a method 400 for rebalancing VNIC-to-PNIC assignments in case of PNIC failure, according to an embodiment. As shown, the method 400 begins at step 410, where host admission control module 118 identifies that a PNIC has failed. PNIC failure may occur whenever the PNIC is unable to satisfy the extant policies, such as when PNIC hardware fails or when VNIC bandwidth reservations are increased to be greater than the total bandwidth the PNIC can provide, among other things.

When host admission control module 118 determines that any PNIC has failed, host admission control module 118 generates an alert at step 420, which may be displayed to the user, and further notifies resource scheduler module 132 and/or high availability module 133 of the PNIC failure. In one embodiment, admission control module 118 may first determine whether the PNIC failure causes any of the VMs to lose its guaranteed bandwidth reservation and, if such is the case, generate alarms for those VMs. In response to receiving such an alarm notification, resource scheduler module 132 or high availability module 133 may try to remediate the problem by moving one or more VMs out of the host. In addition to failure of a PNIC, host admission control module 118 may also generate an alert any time the VNIC reservation requirements cannot be met, such as when a user intentionally increases the reserved bandwidth and the host PNICs are unable to provide the increased bandwidth.

Then, at step 430, resource scheduler module 132 employs the bin-packing algorithm, discussed above, to determine a placement for the VNIC(s) which were connected to the failed PNIC. As discussed, the bin-packing algorithm may be a worst-fit first algorithm that assigns the VNIC(s) to PNICs having the most free resources so as to distribute the network load roughly equally across the PNICs.

Then, at step 440, resource scheduler module 132 applies the determined placement by reattaching the VNIC(s) to the appropriate PNIC(s) and migrating the VM(s) across host servers, if necessary to achieve the reattaching. In another embodiment, the reverse operation may also be implemented, in which the reattached VNIC(s) are detached again and attached back to the original PNIC when the original PNIC that had failed comes back online.

Advantageously, techniques disclosed herein permit network control to be imposed on virtual switches and DVSwitches in particular. Network resource allocation requirements in the form of limits, shares, and reservations may be specified for virtual infrastructure traffic as well as for communication endpoints of particular virtual computing instances. Such requirements may then be enforced at both the virtual switch and host levels to ensure that when reservation requirements are not met, virtual computing instances are not allowed to be created. In addition, resource scheduling and high availability modules are made aware of the networking resource allocation requirements and network runtime information so that virtual computing instances can be created on hosts that satisfy the requirements.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for provisioning a virtual computing instance on a host computing device, comprising:

receiving a request to provision the virtual computing instance not yet created on the host computing device, wherein a communication endpoint of the virtual computing instance is associated with a network bandwidth reservation specifying a minimum bandwidth guaranteed to the communication endpoint for communicating traffic to and from software executing in the virtual computing instance, the network bandwidth reservation specifying the minimum bandwidth being a hard constraint that must be met in order for the virtual computing instance to be provisioned on the host computing device;

determining whether the host computing device includes a physical network interface device having at least the minimum bandwidth available;

when it is determined the host computing device includes the physical network interface device having at least the minimum bandwidth available, assigning the communication endpoint to the physical network interface device and creating the virtual computing instance in the host computing device; and when it is determined the host computing device includes no physical network interface device having at least the minimum bandwidth available, not creating the virtual computing instance in the host computing device.

2. The method of claim 1, wherein determining whether the host computing device includes a physical network interface device having at least the minimum bandwidth available comprises determining whether a physical network interface device of the host computing device having the largest available bandwidth of a plurality of physical network interface devices has at least the minimum bandwidth available.

3. The method of claim 2, wherein determining whether the host computing device includes a physical network interface device having at least the minimum bandwidth available further comprises reassigning one or more communication endpoints from one or more physical network interface devices of the plurality of physical network interface devices to one or more different physical network interface devices of the plurality of physical network interface devices to increase an available bandwidth on the one or more physical network interface devices.

4. The method of claim 1, wherein the request to provision the virtual computing instance further specifies a network resource pool to which the virtual computing instance is to be connected, further comprising, determining whether the network bandwidth reservation can be accommodated by an aggregated virtual computing instance network traffic reservation bandwidth of the network resource pool.

5. The method of claim 4, wherein, in addition to the virtual computing instance network traffic reservation, network bandwidth reservations are specified for system traffic, the system traffic including at least one of live virtual machine migration traffic, virtual storage area network (VSAN) traffic, host-based replication (HBR) traffic, network file system (NFS) traffic, continuous availability application traffic, and Internet Small Computer System Interface (i SC SI) traffic.

6. The method of claim 1, wherein determining whether the host computing device includes a physical network interface device having at least the minimum bandwidth available is performed by one of a resource scheduler which balances workloads in a virtual computing environment and a high availability module which provides failover protection.

7. The method of claim 1, further comprising:

determining that a first physical network interface device of the host computing device has failed, the first physical network interface device having assigned at least one communication endpoint associated with at least one network bandwidth reservation specifying at least one minimum bandwidth guaranteed to the at least one communication endpoint for communicating traffic to and from software executing in at least one virtual computing instance;

determining whether the host computing device includes another physical network interface device having at least the at least one minimum bandwidth available; and when it is determined the host computing device includes the other physical network interface device having at least the at least one minimum bandwidth available, assigning the at least one communication endpoint to the other physical network interface device.

8. The method of claim 1, wherein the assigned communication endpoint is attached to a distributed virtual port (DVport) of a distributed virtual switch (DVSwitch) through which the communication endpoint is connected to the physical network interface device.

9. The method of claim 1, wherein the communication endpoint is further associated with at least one of a limit specifying a maximum bandwidth that can be allocated to the communication endpoint and a share value specifying a weight provided to flows of the communication endpoint when sharing bandwidth available for burst.

10. A non-transitory computer-readable storage medium containing a program which, when executed by one or more processors, performs operations for provisioning a virtual computing instance on a host computing device, comprising:

receiving a request to provision the virtual computing instance not yet created on the host computing device, wherein a communication endpoint of the virtual computing instance is associated with a network bandwidth reservation specifying a minimum bandwidth guaranteed to the communication endpoint for communicating traffic to and from software executing in the virtual computing instance, the network bandwidth reservation specifying the minimum bandwidth being a hard constraint that must be met in order for the virtual computing instance to be provisioned on the host computing device;

determining whether the host computing device includes a physical network interface device having at least the minimum bandwidth available;

when it is determined the host computing device includes the physical network interface device having at least the minimum bandwidth available, assigning the communication endpoint to the physical network interface device and creating the virtual computing instance in the host computing device; and when it is determined the host computing device includes no physical network interface device having at least the minimum bandwidth available, not creating the virtual computing instance in the host computing device.

11. The computer-readable storage medium of claim 10, wherein determining whether the host computing device includes a physical network interface device having at least the minimum bandwidth available comprises determining whether a physical network interface device of the host computing device having the largest available bandwidth of a plurality of physical network interface devices has at least the minimum bandwidth available.

12. The computer-readable storage medium of claim 11, wherein determining whether the host computing device includes a physical network interface device having at least the minimum bandwidth available further comprises reassigning one or more communication endpoints from one or more physical network interface devices of the plurality of physical network interface devices to one or more different physical network interface devices of the plurality of physical network interface devices to increase an available bandwidth on the one or more physical network interface devices.

13. The computer-readable storage medium of claim 10, wherein the request to provision the virtual computing instance further specifies a network resource pool to which the virtual computing instance is to be connected, and wherein the operations further comprise determining whether the network bandwidth reservation can be accommodated by an aggregated virtual computing instance network traffic reservation bandwidth of the network resource pool.

14. The computer-readable storage medium of claim 13, wherein, in addition to the virtual computing instance network traffic reservation, network bandwidth reservations are specified for system traffic, the system traffic including at least one of live virtual machine migration traffic, virtual storage area network (VSAN) traffic, host-based replication (HBR) traffic, network file system (NFS) traffic, continuous availability application traffic, and Internet Small Computer System Interface (iSCSI) traffic.

15. The computer-readable storage medium of claim 10, wherein determining whether the host computing device includes a physical network interface device having at least the minimum bandwidth available is performed by one of a resource scheduler which balances workloads in a virtual computing environment and a high availability module which provides failover protection.

16. The computer-readable storage medium of claim 10, the operations further comprising:

determining that a first physical network interface device of the host computing device has failed, the first physical network interface device having assigned at least one communication endpoint associated with at least one network bandwidth reservation specifying at least one minimum bandwidth guaranteed to the at least one communication endpoint for communicating traffic to and from software executing in at least one virtual computing instance;

determining whether the host computing device includes another physical network interface device having at least the at least one minimum bandwidth available; and when it is determined the host computing device includes the other physical network interface device having at least the at least one minimum bandwidth available, assigning the at least one communication endpoint to the other physical network interface device.

17. The computer-readable storage medium of claim 10, wherein the assigned communication endpoint is attached to a distributed virtual port (DVport) of a distributed virtual switch (DVSwitch) through which the communication endpoint is connected to the physical network interface device.

18. The computer-readable storage medium of claim 10, wherein the communication endpoint is further associated with at least one of a limit specifying a maximum bandwidth that can be allocated to the communication endpoint and a share value specifying a weight provided to flows of the communication endpoint when sharing bandwidth available for burst.

19. A system, comprising:
a processor; and
a memory, wherein the memory includes a program executable in the processor to perform operations for provisioning a virtual computing instance on a host computing device, the operations comprising:

receiving a request to provision the virtual computing instance not yet created on the host computing device, wherein a communication endpoint of the virtual computing instance is associated with a network bandwidth reservation specifying a minimum bandwidth guaranteed to the communication endpoint for communicating traffic to and from software executing in the virtual computing instance, the network bandwidth reservation specifying the minimum bandwidth being a hard constraint that must be met in order for the virtual computing instance to be provisioned on the host computing device;

determining whether the host computing device includes a physical network interface device having at least the minimum bandwidth available;

when it is determined the host computing device includes the physical network interface device having at least the minimum bandwidth available, assigning the communication endpoint to the physical network interface device and creating the virtual computing instance in the host computing device; and when it is determined the host computing device includes no physical network interface device having at least the minimum bandwidth available, not creating the virtual computing instance in the host computing device.

20. The system of claim 19, wherein determining whether the host computing device includes a physical network interface device having at least the minimum bandwidth available comprises determining whether a physical network interface device of the host computing device having the largest available bandwidth of a plurality of physical network interface devices has at least the minimum bandwidth available.

21. The method of claim 1, wherein the host computing device is one of a plurality of host computing devices comprising a cloud based system.

* * * * *